Dec. 29, 1936. J. SCHNUR 2,065,828
BOX LINING MACHINE
Filed Jan. 10, 1934 9 Sheets-Sheet 4
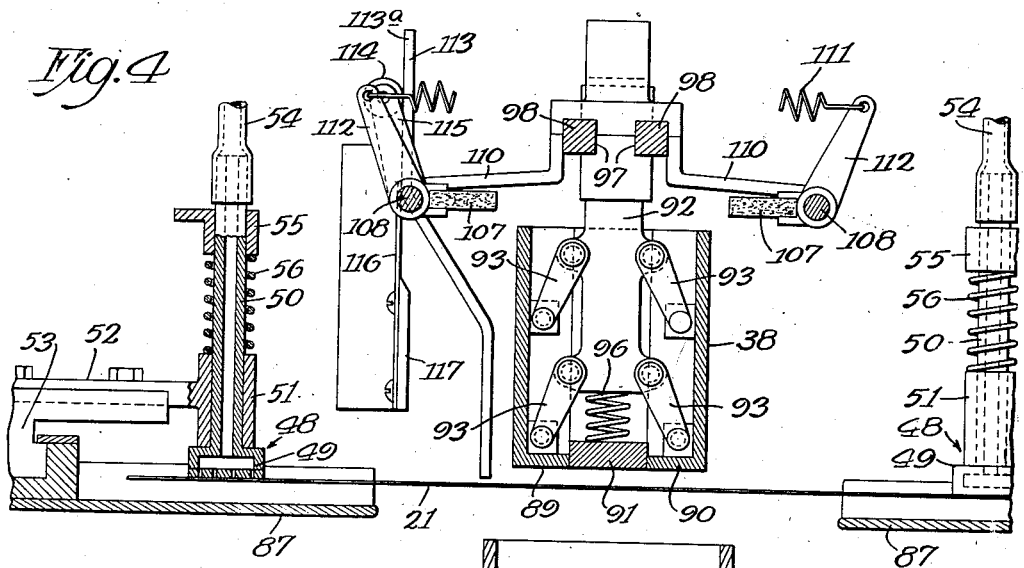
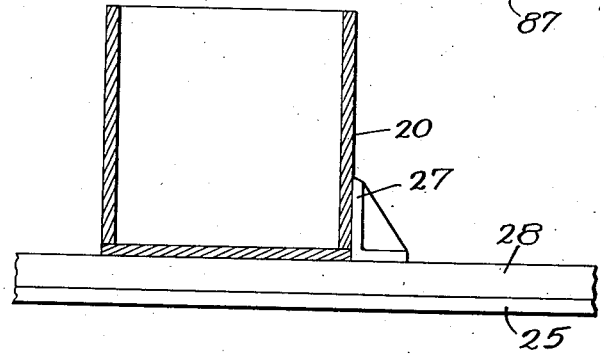
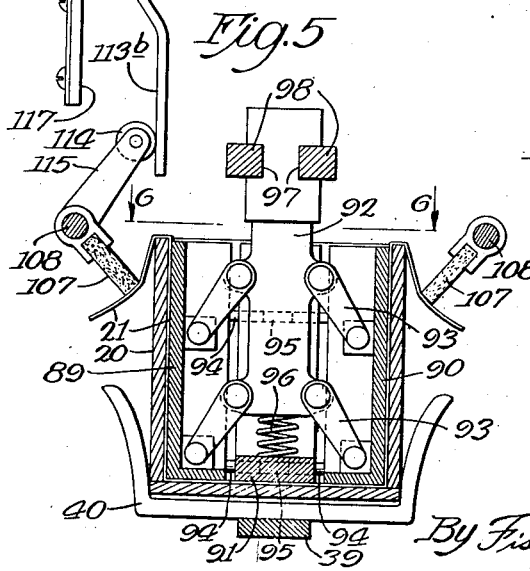
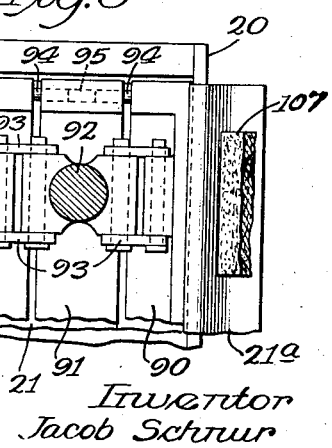
Inventor
Jacob Schnur
By Fisher, Clapp, Soans & Paul Attys.

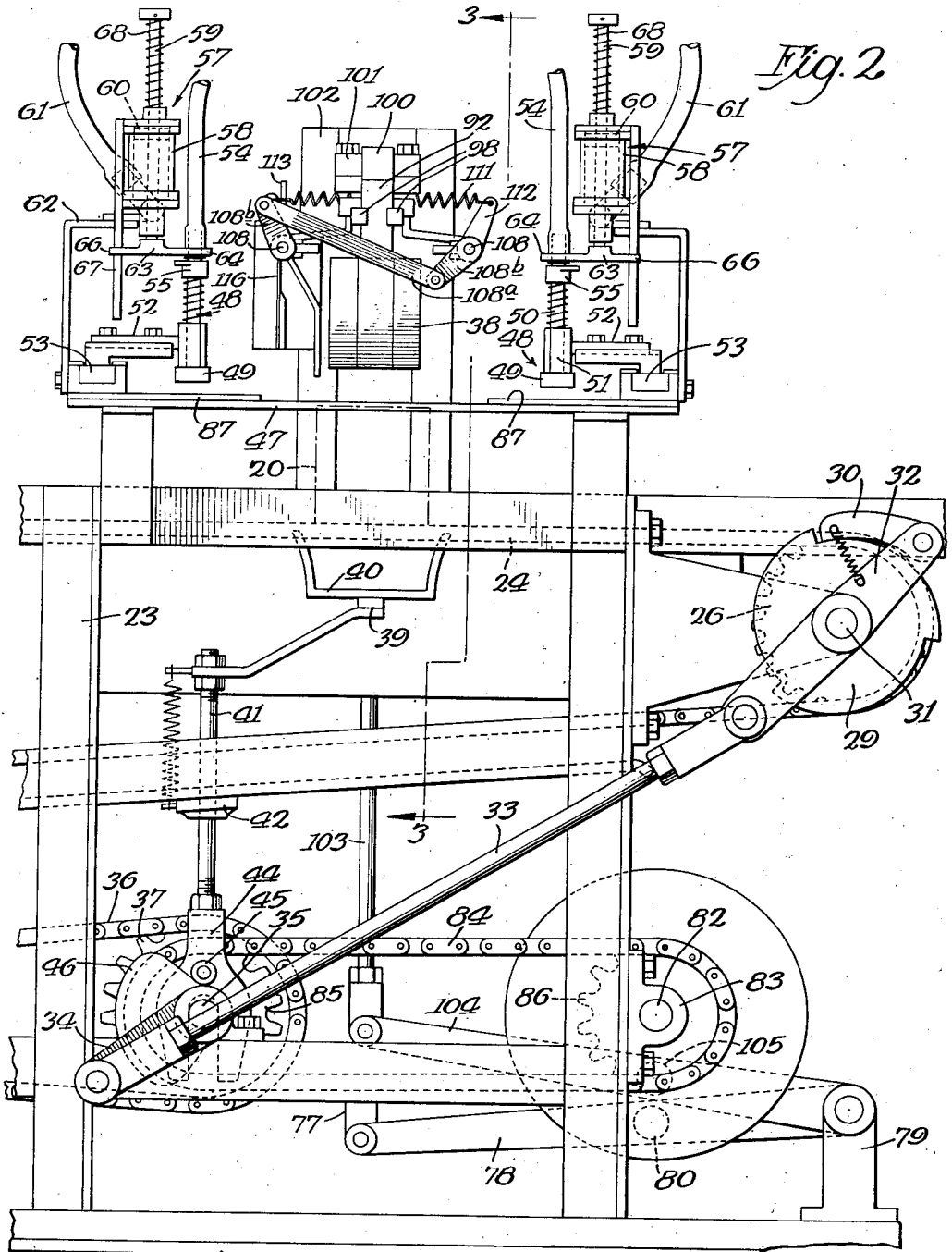

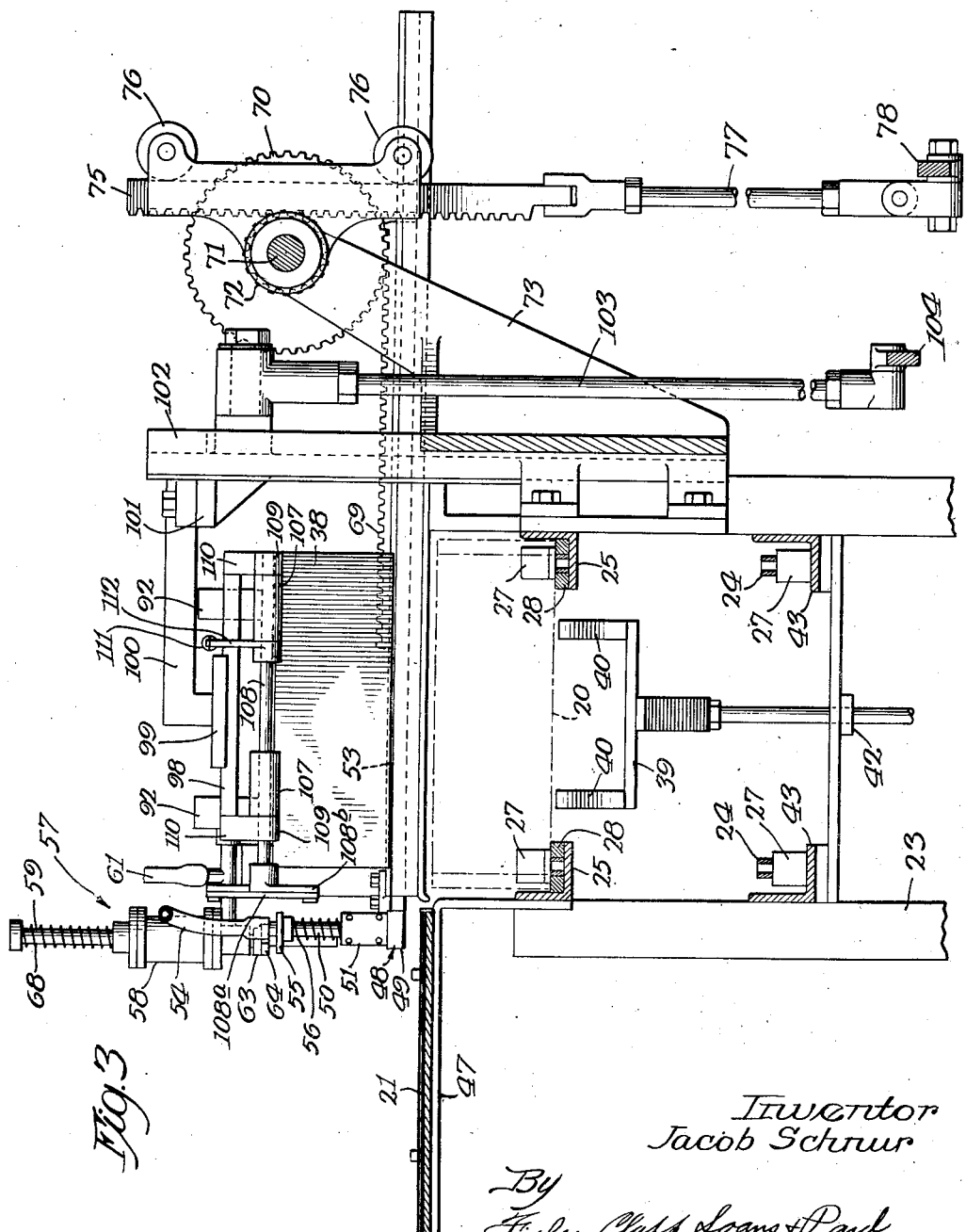

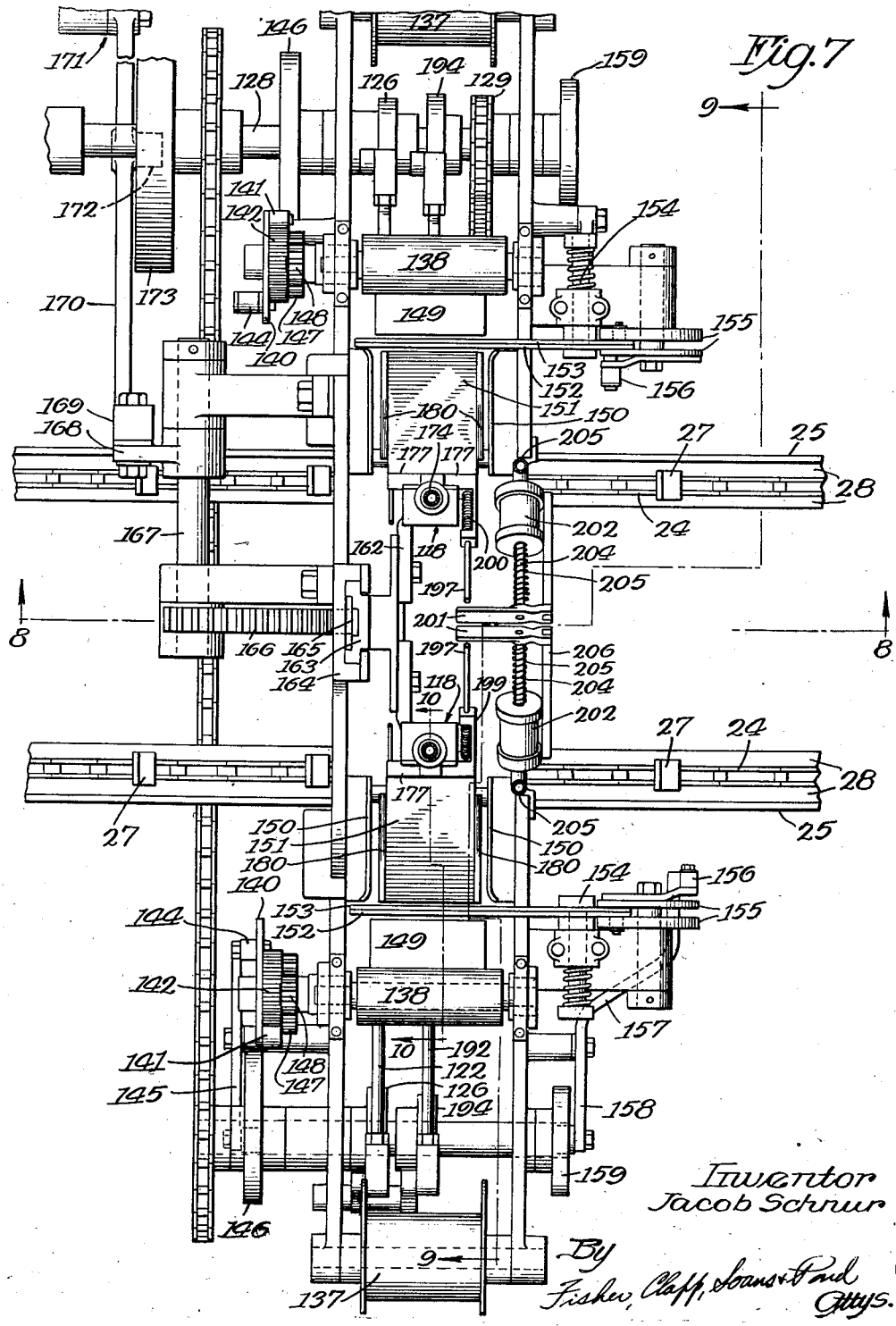

Dec. 29, 1936.     J. SCHNUR     2,065,828
BOX LINING MACHINE
Filed Jan. 10, 1934     9 Sheets-Sheet 6
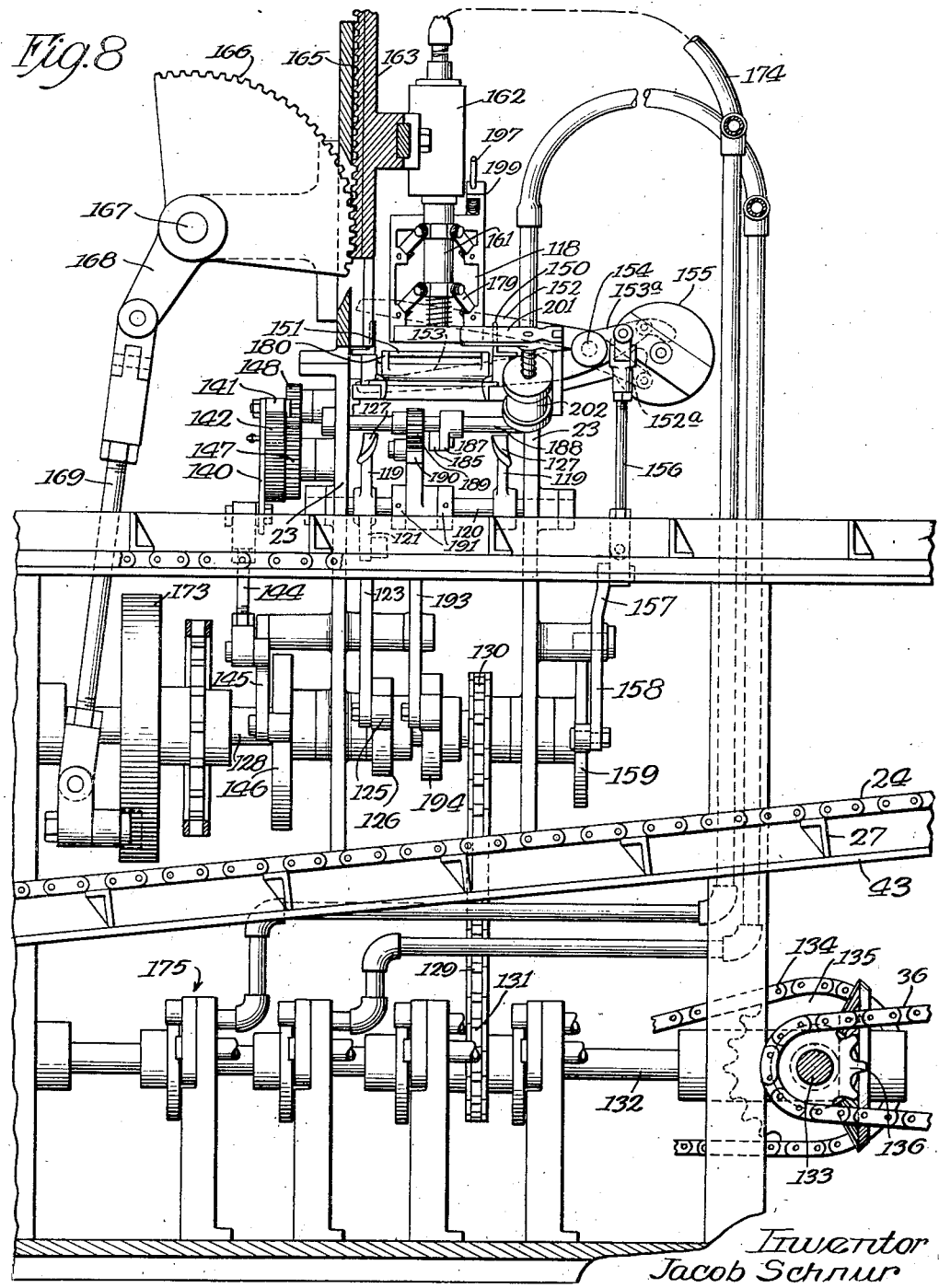

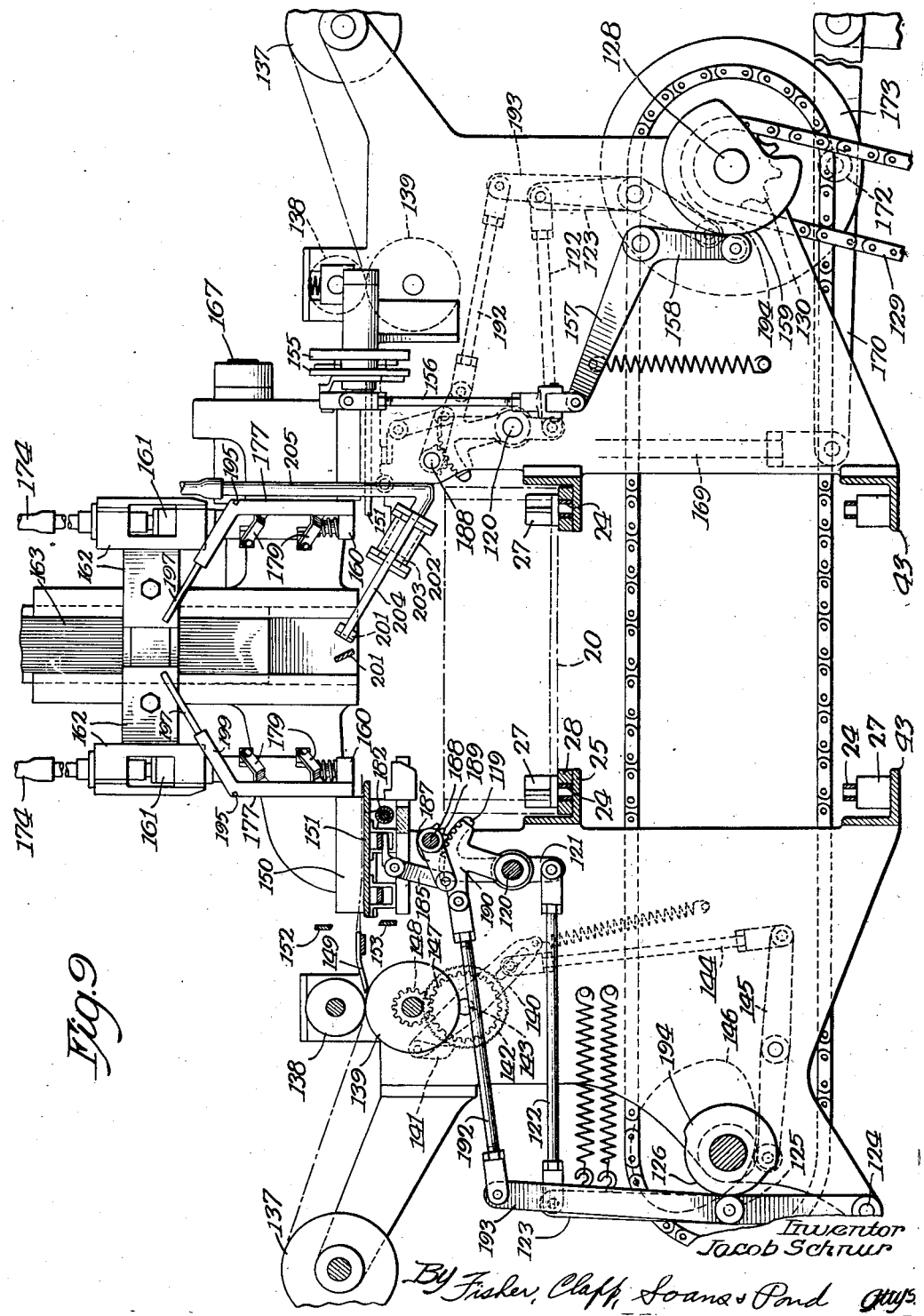

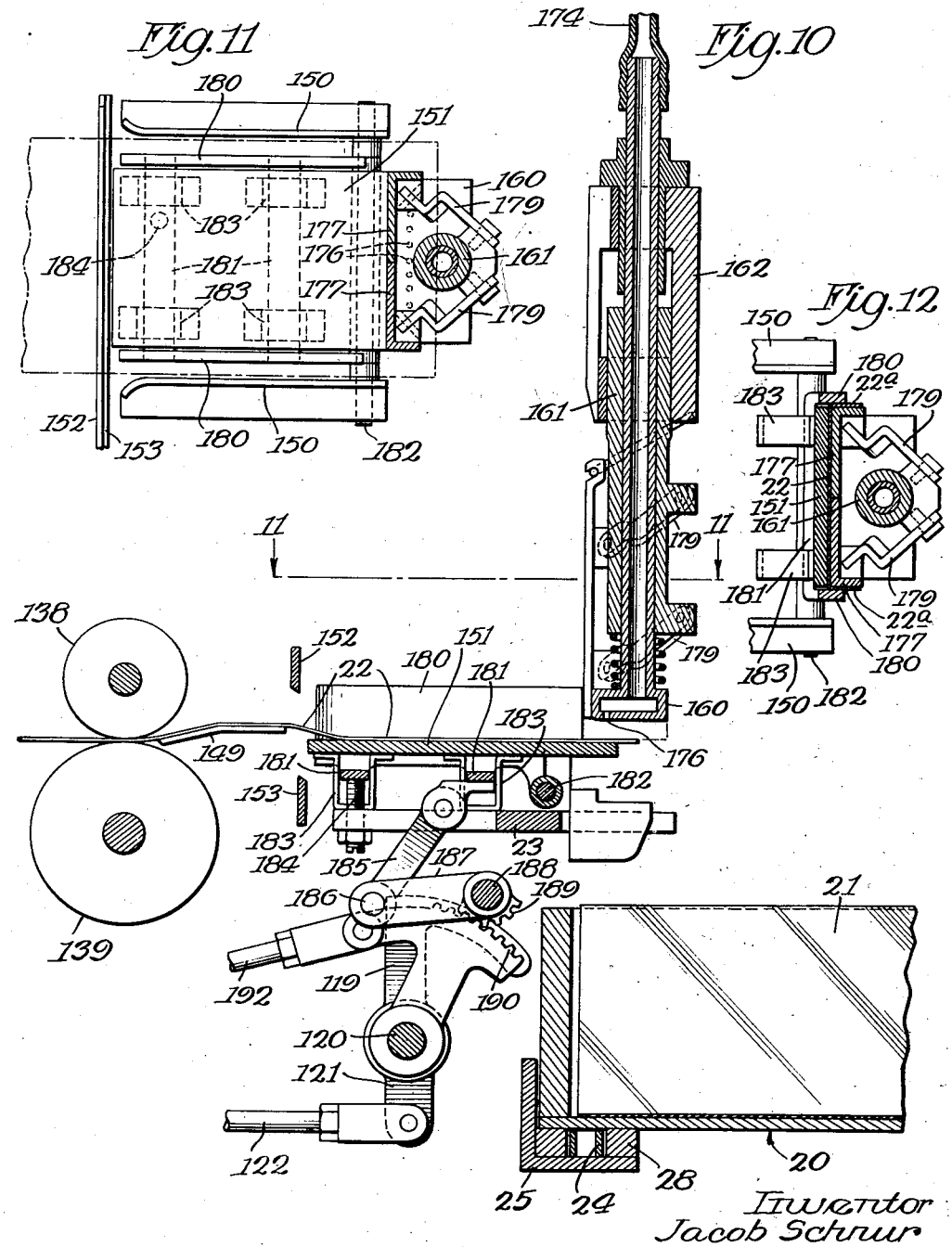

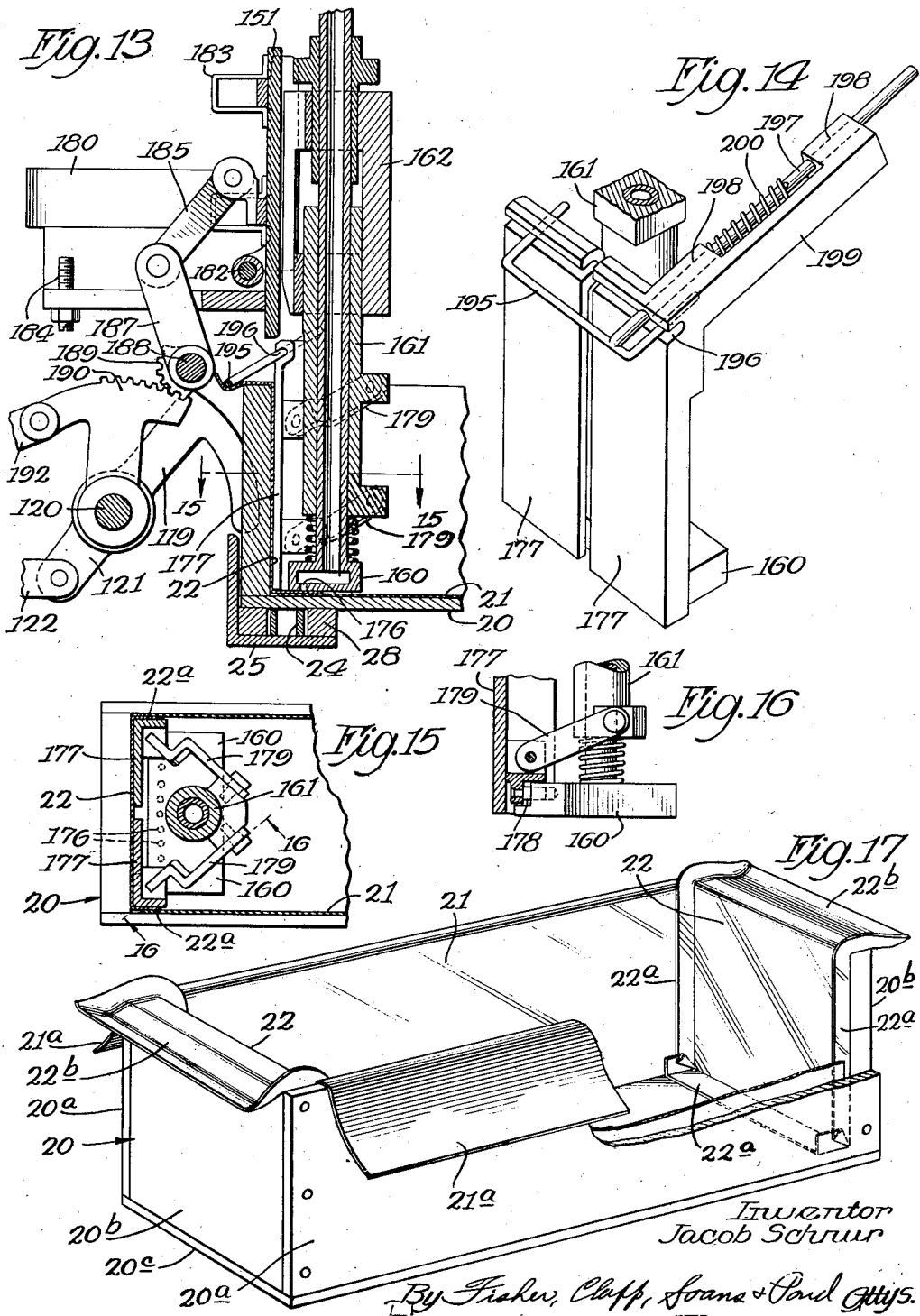

Patented Dec. 29, 1936

2,065,828

UNITED STATES PATENT OFFICE 2,065,828

BOX LINING MACHINE

Jacob Schnur, Chicago, Ill., assignor to Kraft-Phenix Cheese Corporation, Chicago, Ill., a corporation of Delaware Application January 10, 1934, Serial No. 706,749

16 Claims. (Cl. 93—36.01)

This invention relates to box lining machines, and the main objects of the invention are to provide means for automatically inserting lining material in a box; to provide such means which will press the lining material to the bottom and side walls of the box and leave the lined box in condition to receive a filling of the product for which the lined box is intended, for example,·a filling of cheese, which may be poured directly into the lined box in which it subsequently sets or becomes firm; to provide means for automatically feeding the boxes to be lined and the lining material to the mechanism for inserting the lining material in the boxes; and in general, it is the object of the invention to provide an improved box lining machine.

Other objects and advantages of the invention will be understood by reference to the following specification and accompanying drawings (9 sheets), in which there is illustrated a box lining machine embodying a selected form of the invention.

In the drawings—

Fig. 2 is a front elevation of the machine portion shown in plan in Fig. 1;

Fig. 3 is a section on the line 3—3 of Fig. 2;

Fig. 4 is a section on the line 4—4 of Fig. 1 but illustrating a changed position of certain parts;

Fig. 5 is a section similar to Fig. 4 but showing a changed position of some of the parts;

Fig. 6 is a section on the line 6—6 of Fig. 5;

Fig. 7 is a plan of another portion of the machine;

Fig. 8 is a section on the line 8—8 of Fig. 7;

Fig. 9 is a section on the line 9—9 of Fig. 7;

Fig. 10 is a section on the line 10—10 of Fig. 7;

Fig. 11 is a section on the line 11—11 of Fig. 10;

Fig. 12 is a section similar to Fig. 11 but showing a changed position of certain of the parts;

Fig. 13 is a section similar to Fig. 10 but showing a changed position;

Fig. 14 is a perspective illustrating a lining sheet inserting unit;

Fig. 15 is a section on the line 15—15 of Fig. 13;

Fig. 16 is a section on the line 16—16 of Fig. 15; and

Fig. 17 is a perspective illustrating a lined box as delivered by the machine disclosed.

Figure 1:
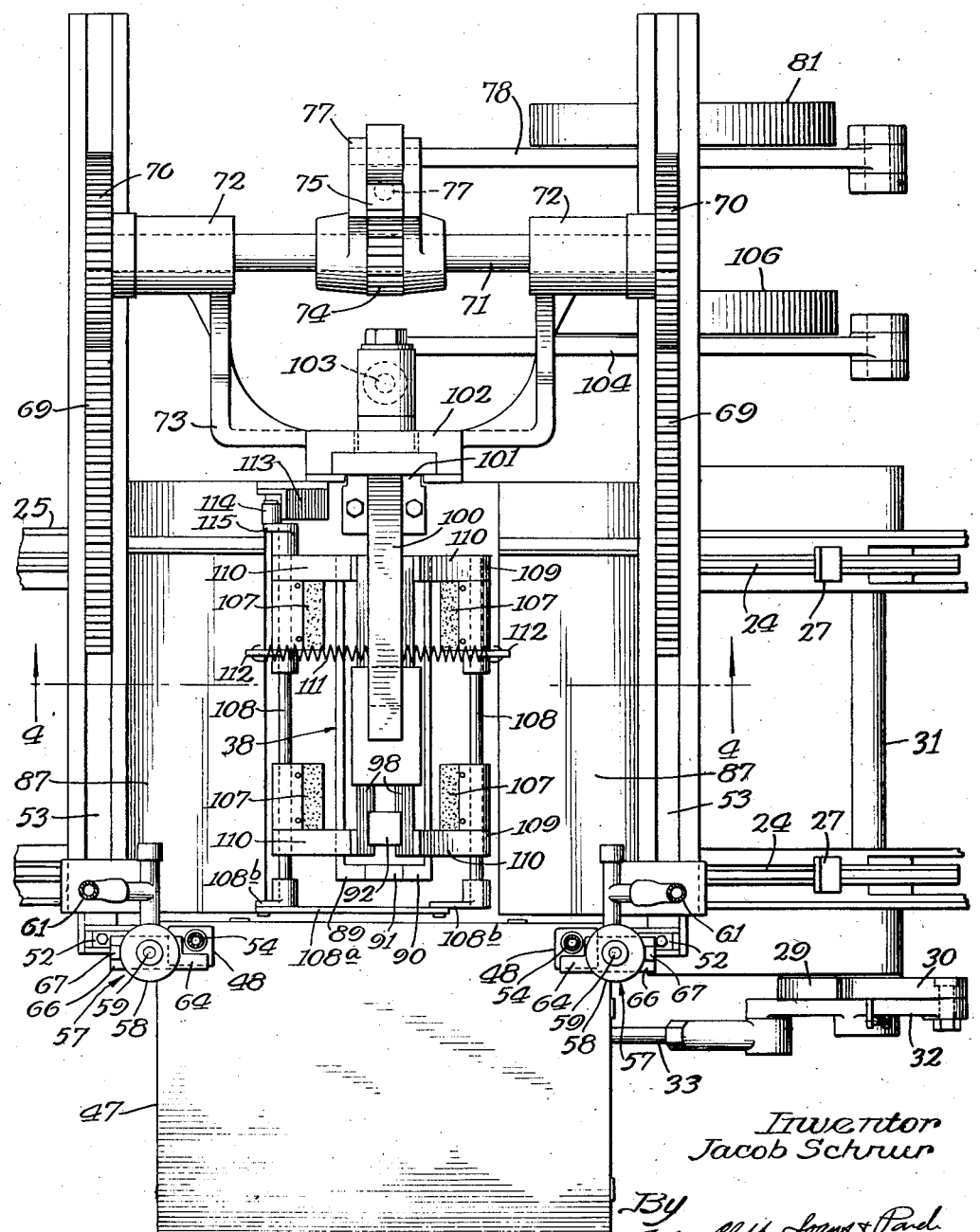
Fig. 1 is a plan of a portion of the machine.

Referring now to the drawings, and more particularly to Fig. 17, the product of the machine will first be explained so as to facilitate further explanation of the mechanism and function of the various parts of the machine. As shown in Fig. 17, the box to be lined by the machine disclosed in this application is a wooden box 20, having side walls 20$^a$, 20$^a$, end walls 20$^b$, 20$^b$ and a bottom wall 20$^c$. The box parts are suitably secured together, for example, by nailing, and the top is left open. The box, when used for packaging such material as cheese, is desirably lined with metal foil and it is advantageous to provide a lining which will be substantially impervious to air to thereby preserve the contents of the box.

In this instance, the lining of the box consists of a sheet 21 preferably of metal foil, this sheet being inserted in the box and pressed tightly against the bottom and the opposite side walls 20$^a$ of the box. Marginal portions 21$^a$ of the lining sheet 21 are folded outwardly and downwardly over the top edges of the respective side walls.

The end walls of the box are each covered by an independent sheet of lining material designated 22, such sheet being provided with flange portions 22$^a$, 22$^a$, which overlap the respectively adjacent marginal end portions of the sheet 21. Top marginal portions 22$^b$ of the end lining sheets are also folded outwardly and downwardly over the top edges of the respective end walls.

The mechanism about to be described is arranged to press the respective lining sheets snugly against the interior surfaces of the box and to press the flange portions of the end lining sheets into intimate engagement with the respectively overlapped portions of the lining sheet 21 so as to obtain a substantially impervious lining for the box. After the lining is inserted in the box so as to produce the arrangement illustrated in Fig. 17, the box may be filled with material such as cheese in a more or less liquid state, wherein it flows into all of the corners of the lined box and by its own pressure, tends to maintain the overlapped portions of the end lining sheets 22 and the lining sheet 21 in said intermediate engagement. The cheese product subsequently sets or becomes firm in the box and the flaps or marginal portions of the various lining sheet elements are folded inwardly over the top of the content to complete the metal foil casing of the product. A suitable box cover, for example, a wood cover may then be attached to the open top of the box to close the same.

As indicated in Fig. 17, the lining sheet element 21 which covers the opposite sides and bottom of the box, is inserted in the box first. The mechanism for inserting that portion of the lining is illustrated in Figs. 1 to 6 inclusive. By reference to said figures, it will be seen that there is a main framework designated 23 which supports a conveyor chain 24. Suitable guides in the form of angle iron members 25, 25 are provided for guiding the conveyor chains 24 and the chain engages a sprocket 26 which is journaled in suitable brackets supported by the frame, as clearly shown in Fig. 2. The chains 24 also extend around another set of sprockets carried by the portion of the machine illustrated in Figs. 7 to 16 inclusive and will be hereafter described. The chains 24, 24 are provided with cleats or lugs 27 which are arranged in spaced relation to receive boxes between them and to feed the boxes forwardly with the movement of the chains. As best shown in Fig. 3, the boxes 20 are positioned on supports 28, 28 carried by the angle iron guide straps 25, such supports being in the form of two narrow straps between which the respective chains are disposed.

The chains 24, 24 are advanced step-by-step through the agency of a ratchet 29 carried by the shaft on which the sprockets 26 are mounted and a pawl 30 which successively engages the ratchet teeth and is rocked about the axis of the sprocket and ratchet shaft designated 31. The pawl 30 is pivoted to one end of a lever 32 which is pivoted intermediate its ends on the shaft 31 and which has pivoted to its other end, one end of a connecting rod 33. The other end of the connecting rod 33 is pivoted to a crank 34 which is carried by a shaft 35, the latter being driven by means of a suitably driven chain 36 which engages a sprocket 37 secured to said shaft 35.

Boxes 20 are positioned either manually or otherwise on the box supports 28 and in engagement with transversely aligned cleats 27 on the feed chains, so that the boxes are advanced step-by-step and are successively positioned in alignment with a vertically reciprocable plunger 38. For accurately aligning the boxes with the plunger 38, there is provided a box-positioning device 39 which is equipped with brackets 40, 40 designed to embrace the lower portions of the box adjacent its opposite ends. The positioning device 39 is maintained in fixed horizontal position but is vertically adjustably carried by a rod 41 which is vertically slidably mounted adjacent its upper end in a bearing 42 carried by guide members 43 for the lower or returning reach of the chains 24. The lower end of the rod 41 is provided with a forked bracket 44 which straddles the driven shaft 35 so as to prevent lateral movement of the rod 41, while permitting vertical movement thereof. The bracket 44 is provided with a roller 45 which engages a cam 46 carried by the shaft 35 and designed to effect the desired vertical movement of the box-positioning device. Of course, the cam 46 is so timed that the box-positioning device will operate in synchronized relation with the other parts of the mechanism. It is preferred that the positioning device 40 be moved to such an extent that it merely aligns the box with the plunger but does not lift the box off the supports 28, which should preferably continue to support the box throughout all of the subsequent operations.

During the last step of movement in which a box is advanced to the zone of operation of the plunger, a sheet of lining material 21 is fed to a position overlying the boxes. As shown in Figs. 1 and 3, there is provided a table-like member or shelf 47 which supports a stack S of lining sheets 21 at one side of the path of travel of the boxes. For feeding the lining sheets 21 one-by-one to a position overlying the box aligned with the plunger 38, there is provided the following pneumatic sheet-feeding mechanism:

Adjacent each side of the stack of lining sheets, there is disposed a pneumatic pick-up device 48 which consists of a hollow head part 49 carried on the lower end of a tube 50 which is vertically slidably mounted in a bearing element 51 which is formed integral with an arm 52 through which it is secured to a transversely slidably mounted member 53. The hollow head 49 has a plurality of small openings in its lower face which is adapted to be engaged with the top sheet of the lining sheet stack. The upper end of the tube 50 is connected by means of a flexible tube 54 with a suitable vacuum pump. Valve means, which will presently be described, are provided for controlling the suction of air through the pick-up head 49. Adjacent the upper end of the pick-up tube 50 there is fixedly mounted a bracket 55 and a coil spring 56 is interposed between the lower end of the bracket 55 and the upper end of the bearing 51 to normally and yieldingly hold the pick-up member in predetermined elevated position, as illustrated in Fig. 4. The tube 50 is preferably squared except at its upper end where the hose 54 is connected to it, so as to prevent rotation within the bearing 51.

There is associated with each of the pick-up members 48, a pneumatic pick-up depressing member 57 which consists of a cylinder 58 through which a rod 59 is slidable. The rod 59 carries a plunger 60 and the cylinder 58 has a suitable connection adjacent its lower end to the suction pump previously referred to. Suitable valves, presently to be described, are also provided for controlling the application of suction to the cylinder 58. As shown, a flexible hose 61 serves to connect the cylinder with the suction pump. The cylinder 58 is suitably secured to a bracket 62 which is carried by a fixed or stationary part of the machine so that the cylinder does not move. The lower end of the rod 59 which extends through the cylinder is provided with a presser foot 63 having a portion 64 projecting over a rearwardly disposed portion of the bracket 55 of the pick-up mechanism and said presser foot also has a portion 66 slidably engaging a guide rod 67 to prevent rotary movement of the presser foot. It will be seen that when suction is applied to the cylinder 58, the presser foot 63 will be lowered and through engagement with the bracket 55 will depress the vacuum pick-up device 48 into engagement with the top lining sheet of the stack S. The valve means already alluded to cuts off the vacuum in the cylinder 58 at the proper time and opens the cylinder 58 to the atmosphere to relieve the vacuum and thereby permit a spring 68 to restore the presser foot to its normal position while the spring 56 serves to elevate the sheet pick-up device.

The pick-up device with a sheet held thereto by vacuum is next moved transversely to carry a lining sheet over the top of a box. For this purpose, the slidably mounted members 53 are each provided with an upwardly facing rack 69 which mesh with gears or segments 70 which are carried by a suitably journaled shaft 71. In this instance, the shaft 71 is journaled in suitable bearings 72 formed in bearings such as indicated at 73 (Fig. 3).

On the shaft 71, intermediate the gear 70 there is fixed a pinion 74 which is designed to mesh with a vertically reciprocable rack 75. The rack 75 is guided by means of rollers 76 which are carried by a suitably formed bracket 77 which is carried by the shaft 71. The lower end of the rack 75 is pivotally connected to one end of a link 77, the lower end of which is pivoted by means of a suitable connection to one end of a rock lever 78, the other end of which is pivotally mounted on a bracket 79 which is fixedly mounted on the framework of the machine. Intermediate its ends, the rock lever 78 is provided with a roller 80 which engages a suitable cam track provided in a cam disk 81 which is carried by a shaft 82. The shaft 82 is rotatably mounted in suitable bearings such as indicated at 83 which are carried by the framework of the machine and this shaft is driven by means of a chain 84 which engages sprockets 85 and 86 on the driven shaft 35 and the shaft 82 respectively. The cam track in the disk 81 is shaped so as to provide the desired rocking movement of the rock lever 78 to effect the desired horizontal reciprocation of the slide members 53 which carry the pick-up members. Of course the cam which controls the operation of the pick-up movement is timed to effect such movement in proper synchronism with the other operations of the machine. The lining sheet thus carried over the box is disposed on shelf members 87, 87 which are disposed on opposite sides of the plunger and slightly above the plane of the top of the box. The valve means for controlling the suction in the pick-up members is suitably actuated to relieve the vacuum to drop the lining sheet on the said shelves.

The next step in the operation of the mechanism is that of inserting the lining sheet in the box. The plunger designated 38 serves this purpose and it comprises complementary side portions 89 and 90 and an intermediate or bottom part 91, all of which are connected adjacent their respective ends to a pair of carrier members 92, 92. The plunger side parts 89 and 90 are connected to the carrier members 92 by means of pairs of parallel links designated 93, 93 which extend downwardly and outwardly from the carrier to their respective connections with the side parts. The members 89 and 90 are further connected to the bottom member 91 by means of pins 94 which are securely mounted in the respective side parts and project inwardly and fit slidably in openings 95 drilled in the bottom member. Such slidable pin connections are locate adjacent the opposite ends of the plunger structure, as indicated in Fig. 6, and they may also be located at suitable points in the length of the plunger. The described slidable pin connection serves to cause the plunger parts 89, 90 and 91 to be movable vertically in unison, while at the same time permitting the side parts to be adjusted outwardly relative to the bottom part to thereby expand the normal width of the plunger. Springs such as 96 interposed between the respective carriers 92 and the bottom member 91 serve to normally maintain the bottom member in its lowermost position of adjustment relative to the carrier, such position being determined by engagement of the side members 90 with the opposite edges of the bottom member, it being understood that the side members are caused to swing downwardly and inwardly into such engagement with the bottom member by their parallel link connections with the carriers 92.

The carriers 92 are grooved on their opposite sides as indicated at 97 to receive spaced rods 98, 98 which are supported by being attached to a downwardly facing head plate 99 which is formed integrally with the free end of an arm 100, the other end of which is suitably secured to a vertically reciprocable member 101. The member 101 is vertically slidably mounted in a guide-way 102 which is rigidly secured to the framework of the mechanism, as best shown in Fig. 3. The member 101 is connected to one end of a link 103, the other end of which is connected to the free end of a rock arm 104, the other end of which is pivoted on the bracket 79. The arm 104 is provided with a roller 105 which engages a cam track in a disk 106, which is carried by the shaft 82. The cam track in the disk 106 is so shaped and timed as to effect rocking of the lever 104 and thereby reciprocation of the plunger carrier arm 100.

When the plunger is moved downwardly from the position illustrated in Fig. 4, it first engages the lining sheet which at that time rests on the shelves 87, 87, and possibly on the top of the box 20, and then in its continued movement into the box, inserts the lining sheet in the box in a loosely fitting condition. The extent of movement of the plunger is somewhat greater than that required to bring the plunger bottom member 91 into engagement with the bottom of the box, and the excess movement serves to cause the plunger members 89 and 90 to spread outwardly to press the lining sheet against the box sides, as clearly shown in Fig. 5. Such expansion of the plunger is incident to the engagement of the plunger bottom member 91 with the box bottom and the continued or excess movement of the plunger carriers 92 which, through the parallel link connections with the side members, causes the latter to move outwardly while retaining their transversely aligned relationship with the bottom member. It will be seen that the expansible plunger structure serves to effectively press the lining sheet to the box bottom and side walls.

A further step in the insertion of the lining sheet 21 in the box consists in folding projecting marginal portions of the lining sheet outwardly and downwardly over the top edges of the respective box sides. This folding is accomplished by means of folders 107, 107 respectively associated with the opposite sides of the box. These folders are carried by shafts 108 which are pivotally mounted in bearings 109 formed in brackets 110 which are suitably secured to the plunger supporting rods 98. The folders 107 are normally urged to swing downwardly by means of a spring 111 which is stretched between the free ends of arms 112, 112 which are secured to the respective rods 108 and project upwardly therefrom. The folders are normally maintained in initial or horizontal position, as illustrated in Fig. 4, by means of a relatively stationary cam track element 113 which acts on a roller 114 carried by the free end of an arm 115 which is secured to one of the shafts 108. The cam track 113 is suitably mounted on a conveniently accessible portion of the framework and it is shaped as indicated in Figs. 4 and 5 so that the lowermost portion of the cam track is offset inwardly with respect to the uppermost portion, whereby the arm 115 is permitted to turn inwardly under the influence of the spring 111, with resulting pivotal or folding movement of the folders. Associated with the cam track 113, there is an auxiliary cam track element 116 which is in the form of a spring metal member mounted adjacent its lower end on a bracket element 117 and arranged with its upper free end in contact with the uppermost portion 113ᵃ of the cam track 113. On downward movement of the plunger and the folder, the roller 114 rides downwardly on the portion 113ᵃ of the cam track and then over the auxiliary portion 116 until such time that the roller may drop off the portion 116 and swing into engagement with the offset portion 113ᵇ of the cam track 113. By this arrangement, the folding action is delayed until the lining inserting operation is practically completed.

Upon upward movement of the plunger, the roller 114 of the folding mechanism rides upwardly on the cam track portion 113ᵇ and the inclined cam track portion 113ᶜ until it again is disposed in engagement with the upper portion 113ᵃ. In this movement, the roller 114 swings the portion 116 away from the cam track portion 113ᵃ but as soon as the roller 114 clears the free end of the spring track portion 116, the latter returns to its operative position as illustrated. Simultaneous movement in opposite directions of the folders 107 is effected by means of the inter-connecting link 108ᵃ which is connected at its ends to arms 108ᵇ which extend upwardly and downwardly respectively from the shafts 108.

When the lining sheet 21 has been inserted in the manner above described, the box positioner 40 is next retracted so as to free the box and the box feeding conveyor is again advanced another step to bring another box into operative position with reference to the lining inserting plunger.

Associated with the mechanism thus far described is the mechanism illustrated in Figs. 7 to 16 inclusive which serves the purpose of inserting the end lining sheets 22. Both of the end walls are lined simultaneously. The boxes partially lined by the above described mechanism are fed step-by-step into operative relation to a pair of plunger devices 118, 118 which are respectively disposed adjacent the opposite ends of the box.

For actual positioning the box in alignment with the plungers 118, 118 in this part of the mechanism, there are provided two pairs of finger devices operatively associated with the respective ends of the box. These finger devices include pairs of arms 119, 119 which are carried by shafts such as 120, suitably journaled in upstanding frame parts 23. One of the arms 119 of each pair is provided with an extension 121 which has pivoted to it one end of a link 122, the opposite end of which is pivoted to the free end of a rock lever 123. The rock lever 123 is pivoted at its other end, as indicated at 124, on a frame part provided for that purpose and it is provided intermediate its ends with a cam roller 125 which engages a cam 126 shaped to effect the desired rocking movement of the lever 123 and incidentally swinging of the arm pairs 119. As best shown in Fig. 8, the arms 119 are provided with inwardly extending finger portions 127 which are flared outwardly so that upon inward movement of the fingers they will embrace the box even though it be out of its proper position and adjust the box to the desired position of alignment with the plunger mechanism. The cam 126 which operates the finger pair is carried by a shaft 128 which is journaled in bearings provided in conveniently located frame parts.

It will of course be understood that the above description of the box positioning finger mechanism applies to the mechanism associated with each end of the box. The mechanism is substantially duplicated, except that one is reversed with reference to the other. One of the shafts 128 is driven by means of a chain 129 which engages a sprocket 130 on the shaft 128 and a sprocket 131 which is mounted on a driven shaft 132. The latter is journaled in suitable bearings provided in the framework of the machine and it is driven by means of a suitable gear drive connection with a main drive shaft 133 which may be driven from any suitable source of power by such means as a drive chain 134 which engages a sprocket 135 on the shaft 133 and a sprocket carried by a motor shaft or the like. The chain 36 which transmits power to the shaft 35 of the previously described mechanism, is itself driven by engagement with a sprocket 136 which is carried by the main drive shaft 133, as shown in Fig. 8.

During the time that the box is being positioned by means of the positioning fingers or immediately before or after such time, a lining sheet for each end of the box is prepared. As shown in Fig. 9, rolls of metal foil or like lining material are indicated at 137, 137, such rolls being rotatably mounted on suitable arms projecting from the opposite sides of the framework of the machine. The strip of lining material from each supply roll is threaded between feed roll pairs embodying a presser roll 138 and a driven roll 139. The driven roll 139 is advanced step-by-step through the agency of a pivoted lever 140 which is provided with a pawl 141 at one end for engagement with the teeth of a ratchet wheel 142 which is mounted on a shaft 143. The other end of the lever 140 is connected to one end of a push rod 144, the other end of which is pivoted to one end of a pivoted lever 145. The other end of the pivoted lever 145 is provided with an antifriction roller for engaging a cam 146 which is carried by the driven shaft 128 and serves to rock the lever 145. It will be seen that the cam 146 is operative through the connections described to effect rocking of the pawl carrying lever 140 and hence rotation in one direction of the shaft 143. The shaft 143 also carries a gear 147 which meshes with a pinion gear 148 connected to the feed roll 139 to thereby effect rotation in one direction only of the feed roll 139. The extent of feed movement imparted to the roll 139 may be adjusted through the agency of an adjustable connection between the rock lever 140 and the push rod 144.

The lining material which is fed forwardly by the means just described is guided over a guiding element 149 and between guide strips 150, 150 to a position on a support 151. When the proper length of material is disposed on the support 151, it is severed from the supply strip by means of shears which includes the blades 152 and 153, the latter being pivoted together as indicated at 154. The blade 152 is provided with an extension 152ᵃ which carries a roller disposed in a cam groove provided in a rotatable disk 155. The shear blade 153 similarly is provided with an extension or arm 153ᵃ which is also provided with a roller engaged in a cam groove carried by the said cam wheel 155. The cam wheel 155 is oscillated so as to operate the shears by means of a link 156 having a suitable pivoted connection at its upper end to the cam wheel. The lower end of the link 156 is suitably pivoted to the free end of the arm 157 of a bell crank having another arm 158 provided with an antifriction roller for engaging a cam 159 which is carried by the driven shaft 128. The cam 159 is so shaped as to effect the desired rocking of the bell crank arms 157, 158 and hence the required oscillation of the cam wheel 155 for operating the shears.

By reference to Fig. 10 it will be seen that the lining sheet elements 22 thus formed are positioned on the support 151 with an end portion disposed beneath a plunger element 160 which is carried by a carrier or holder element 161, the latter being in turn carried by means of a bracket 162 which is secured to a vertically slidably mounted member 163.

The member 163 is suitably mounted in a suitable guide 164 which is formed integrally with or suitably attached to the frame of the machine and the slide member 163 is provided with a rack 165 which meshes with a gear segment 166. The gear segment 166 is mounted on a shaft 167 suitably carried by the frame of the machine. The arm 168 is also carried by the shaft 167 and has connected to it one end of a connecting rod 169. The other end of the connecting rod 169 is connected to one end of a rock lever 170 which is pivoted adjacent its other end, as indicated at 171, on a suitable support. Intermediate its ends, the rock lever 170 is provided with a roller 172 which engages a cam groove in a cam wheel 173 which is carried by one of the shafts 128.

The cam 173 is so shaped that it first imparts a short downward movement to the plunger 160. The first downward movement of the plunger 160 brings its bottom surface into engagement with that portion of the lining sheet 22 disposed under the plunger, as indicated in Fig. 10. In order to hold the lining sheet to the plunger 160, the latter is made hollow as shown in Fig. 10 and connected by means of a flexible tube 174 to a vacuum pump (not shown). The exhaustion of air from the plunger by means of the vacuum pump is of course controlled by a suitable cam actuated valve, the location of which is indicated generally at 175 (Fig. 8), the valve being actuated by means of a cam carried by the shaft 132. Other air controlling valves are also illustrated in Fig. 8 and it will be understood that as many valves as required for the purpose of this mechanism may be located in the group illustrated and operated by suitable cams carried by the shaft 132. The bottom of the plunger head 160 is apertured as indicated at 176 to permit vacuum gripping of the engaged portion of the lining sheet 22.

The next step in the operation of the mechanism is that of forming the flanges such as 22ᵃ on the bottom and side edges of the lining sheet 22 preparatory to its insertion in the box. In order to facilitate the formation of such flanges, the plunger 160 has connected to it a pair of side members 177, 177, these members being connected for vertical movement in unison with the bottom part 160 through the agency of a pin-and-hole connection, as indicated at 178 in Fig. 16. The members 177 are further supported by being linked to the plunger carrier 161, in the manner best illustrated in Figs. 10, 11, 12, 15 and 16. As shown in said figures, there are two links 179, 179 associated with each side member 177, each pair of links being pivoted at its lower end to one of the side members and pivoted at its upper end to the plunger carrier 161. As shown, the link pairs 179 constitute parallel link connections between the respective side members 177 and the plunger carrier 161, so that the side members are capable of limited upward and outward expanding movement relative to the carrier but only outward expanding movement relative to the plunger 160. The side members 177 are of a vertical dimension which is somewhat greater than the depth of the box to be lined.

The lining sheet element 22 on the support 151 is next folded upwardly around the lower front corner of the plunger, this being accomplished by swinging the support 151 upwardly. The support 151 has associated with it a pair of side members 180, 180 which are rigidly connected together by means of cross straps 181, 181. The side members 180 are further pivotally mounted on a pintle 182 which is carried in suitable upstanding parts of the framework. The support 151 has a sort of floating connection with the members 180, in that the frame is provided with a plurality of U-shaped strap elements 183 having their legs anchored to the bottom of the support 151 and straddling the cross bars 181. An adjusting screw 184 is provided for supporting the side members 180 in predetermined position relative to the support 151 and the latter is supported by engagement of its brackets 183 with the frame part 23, as shown in Fig. 10.

For actuating the support 151, a link 185 has one end pivoted to a track projecting from one of the cross members 181 and its other end pivoted as indicated at 186 to an arm 187 which is carried by a shaft 188 pivoted in parts of the framework 23. A pinion gear 189 also mounted on the shaft 188 meshes with a gear segment 190 which is mounted for rocking movement on the shaft 120 between positioning collars 191, 191 (see Fig. 8). The segment 190 is rocked through the agency of a connecting rod 192 pivoted at one end, as shown in Figs. 9 and 10, to the gear segment and at its other end to one end of a rock lever 193 which is suitably pivotally mounted, as indicated in Fig. 9, and provided with an antifriction roller for engagement with a cam 194 carried by the shaft 128. As shown in Fig. 9, the rock lever 193 at the left-hand side of the figure is pivoted at one of its ends and provided with a cam-engaging roller intermediate its ends, while the rock lever 193 at the right-hand side of the figure is pivoted intermediate its ends and has a cam engaging roller carried by its free end.

When the gear segment 190 is actuated by the described means, it will be seen that the arm 187 is swung upwardly and through the agency of the link 185 moves the connected side members 180 upwardly about the pintle 182 until the cross members 181 engage the bottom of the support 151. As soon as the support is thus engaged, it will also be swung upwardly about the pintle 182.

During the upward swinging movement of the support 151 and side members 180, the lower or forward end portion of the lining sheet 22 is of course held to the lowered plunger by the vacuum means described so that the liner is carried upwardly into engagement with the faces of the plunger side members 177. By reference to Fig. 12, it will be seen that when the members 151 and 180 assume their folded position with reference to the plunger, the side members 180 fold side portions of the lining sheet over the edges of the members 177 to form the flanges 22ᵃ. Also, it will be evident that in the folding movement, a bottom flange 22ᵃ is also formed (see Fig. 13).

When the lining sheet has thus been provided with side and bottom flanges 22ᵃ, it is in condition for being inserted in the box. This is accomplished by lowering the plunger into the box, by means of a further step in the cam 173 acting through the segment 166. When lowered to insert the lining sheet in the box, the plunger mechanism assumes the relationship shown in Fig. 13. The vacuum is maintained in the plunger 160 to hold the sheet to the plunger during the lowering thereof and when the plunger arrives at its lowermost position, the vacuum is cut off. The cam 173 is shaped to impart slightly greater downward movement than is required to bring the head 160 into engagement with the bottom of the box. During such excess movement, the plunger side members 177 are forced outwardly towards both the end and side walls of the box by reason of the parallel link connections of the side members with the carrier, as above explained. In other words, the plunger side members 177 are moved outwardly toward the respective corners of the box to press the lining sheet 22 and its flanges 22ª against the end wall and side walls respectively. As shown in Figs. 15 and 17, the flanges 22ª overlap the adjacent end portions of the lining sheet 21.

For folding the upper marginal portions of the lining sheet outwardly and downwardly over the top edges of the end walls of the box, there are provided on each of the plungers folders in the form of U-shaped wire members designated 195 having their opposite legs slidably mounted in suitable apertures in the upper ends of the plunger members 177. The apertures through which the folder legs slide are of course suitably elongated to permit the spreading or expanding movement of the plunger parts. The plunger parts are further provided with a transversely extending groove 196 adapted to normally house the folder. The folder is further guided by means of a rod 197 which is slidably mounted in aligned apertures 198, 198 provided in an arm 199 formed integral with one of the plunger parts 177 (see Fig. 14). A spring 200 disposed around a part of the rod 197 serves to normally urge the folder into the recess 196.

When the plunger is in its lowered position as shown in Fig. 13, the upper end of the folder rod 197 is in alignment with a pneumatically operated presser 201. The pneumatic folder operating mechanism is best shown in Figs. 7, 8 and 9. By reference to the said figures, it will be seen that the operating mechanism includes for each holder a cylinder 202 within which is a piston 203 carried by a piston rod 204. A spring 205 normally urges the piston rod to move outwardly, and inward movement of the piston and piston rod is effected by exhaustion of air from the piston through the agency of a connection 205 with an exhaust pump. Of course the connection 205 is controlled by a valve arrangement such as previously referred to. At its upper or free end, the piston 205 carries the presser member 201 which extends laterally so as to overlie the outer end of the folder rod 197 when the latter is in lowered position. For preventing turning of the presser 201, its other end is extended laterally and forked, as best shown in Fig. 7, to engage a stationary guide rod 206 along which the forked end is slidable. As shown in the drawings, the cylinders 202 and pistons 204 are angularly arranged so as to be parallel with the angle of the folder rods 197. Hence, when the piston rod 204 is moved downwardly, it will cause the presser 201 to act directly on its folder rod 197.

When the folder has been moved to its outermost position substantially as shown in Fig. 13, the work of the mechanism is completed and the end lining sheets are inserted and pressed in place so that the box is ready to receive its charge of material. Of course, the plunger mechanism is withdrawn through continued movement of the various operating parts in the obvious manner and the conveyor chains which carry the box are again advanced to discharge the lined box and advance another box into the operating zone of the mechanism.

It will be understood that the mechanism for applying the lining sheet 21 and the mechanism for applying the lining sheets 22 may simultaneously be operating, of course on separate boxes. In the mechanism described, the end lining sheets are inserted after the side lining sheet so that the former overlap the latter. However, it will be seen that this arrangement may be reversed if desired and the side lining sheet 21 inserted after the end lining sheets, so as to cause the side lining sheet to overlap the flange portions 22ª of the end lining sheets.

The described structure presses the lining sheets tightly to the walls of the box and presses the overlapping lining sheets together tightly so as to facilitate the production of a substantially impervious lining in the box. This feature is of considerable value, in that boxes so lined very effectively preserve food products which may be packaged in boxes of the type described. The mechanism is wholly automatic and requires but little attention from an operator.

Changes in the described construction may be made without departing from the spirit of the invention, the scope of which should be determined by reference to the following claims, the same being construed as broadly as possible consistent with the state of the art.

I claim:

1. In a machine of the class described, means for supporting and advancing boxes step-by-step, a plunger adapted to successively enter the boxes, means for effecting accurate alignment of the successive boxes with the plunger, means for feeding a lining sheet into position overlying the box, means for effecting movement of the plunger into the box to insert said lining sheet in the box, said plunger being transversely expansible for pressing the lining sheets to the box sides, means for effecting expansion of said plunger, spring-actuated folding means carried by said plunger mechanism and movable vertically therewith for folding marginal portions of the lining sheet downwardly over the top edges of the box sides, and relatively stationary cam means for controlling said folding means.

2. In a machine of the class described, the combination of box-supporting means, a plunger adapted to enter the box to insert a lining sheet therein, said plunger being laterally expansible after its insertion in the box to press the lining sheet to the box walls, and folding means movable downwardly from the upper edge of the box on the outside thereof for folding marginal portions of the lining sheet downwardly over the top edges of the box sides.

3. In a machine of the class described, the combination of box-supporting means, a plunger adapted to enter the box to insert a lining sheet therein, said plunger comprising a carrier, a bottom member and a pair of side parts connected together for unitary vertical movement but so that said side parts are laterally outwardly adjustable relative to the bottom part, parallel link means extending downwardly and outwardly from said carrier to each of the side parts, and resilient means between said bottom member and the carrier, whereby said side parts are laterally outwardly adjustable as an incident to downward movement of the carrier relative to said bottom member.

4. In a machine of the class described, means for supporting and advancing boxes step-by-step, a plunger adapted to successively enter the boxes, means for effecting accurate alignment of the successive boxes with the plunger, means for feeding a lining sheet into position overlying the box comprising vertically and horizontally adjustably mounted pneumatic sheet pick-up means, horizontally fixed means for effecting downward movement of said pick-up means for engaging the pick-up means with a lining sheet, means for effecting horizontal movement of said pick-up means to carry the engaged lining sheet to said position relative to the box, and means for effecting movement of the plunger into the box to insert said lining sheet in the box.

5. In a machine of the class described, the combination of means for advancing a box step-by-step, means associated with one rest position of a box in its step-by-step movement for inserting in the box a box bottom and side wall lining sheet, means associated with another rest position of the box for forming bottom and side flanges on a box end wall lining sheet and subsequently inserting such sheet in the box with the flanges thereof in overlying relation to an adjacent marginal portion of the bottom and side wall lining.

6. In a machine of the class described, the combination of box-supporting means, and a plunger adapted to enter the box to insert a lining sheet therein, said plunger being laterally expansible diagonally of the box towards a corner thereof to press the lining sheet into such corner and against both adjacent wall portions.

7. In a machine of the class described, the combination of box-supporting means, and a plunger adapted to enter the box to insert a lining sheet therein, said plunger being laterally expansible diagonally of the box, as an incident to engagement thereof with the box bottom, towards a corner thereof so as to press the lining sheet into such corner and against both adjacent wall portions.

8. In a machine of the class described, the combination of box-supporting means, a plunger adapted to enter the box, means for positioning the box in alignment with the plunger, means for positioning a lining sheet in predetermined relation to an end of the box, and means for effecting movement of the plunger into the box to insert said lining sheet in the box, said plunger being transversely expansible diagonally of the box, after insertion of the lining sheet, towards both corners at said end of the box thereby to press the sheet to both the end wall and the adjacent portions of the side walls of the box.

9. In a machine of the class described, the combination of box-supporting means, a plunger adapted to enter the box, means for positioning the box in alignment with the plunger, means for positioning a lining sheet in predetermined relation to an end of the box, and means for effecting movement of the plunger into the box to insert said lining sheet in the box, said plunger comprising a carrier and side parts, the latter being adjustable relative to the carrier and diagonally of the box from normal relation to expanded relation for pressing the lining sheets to both the end wall and the adjacent portions of the box sides.

10. In a machine of the class described, the combination of box-supporting means, a plunger adapted to enter the box, means for positioning the box in alignment with the plunger, means for positioning a lining sheet in predetermined relation to an end of the box, means for effecting movement of the plunger into the box to insert said lining sheet in the box, said plunger comprising a carrier and side parts relatively adjustable from normal relation to expanded relation for pressing the lining sheets to both the end wall and the adjacent portions of the box sides, means for effecting expansion of said plunger, and means for folding a marginal portion of the lining sheet downwardly over the top edge of the box end wall.

11. In a machine of the class described, the combination of box-supporting means, a plunger adapted to enter the box to insert a lining sheet therein, said plunger being laterally expansible towards both the end and side walls of the box to press the lining sheet thereto, and means for folding a marginal portion of the lining sheet downwardly over the top edge of the end wall.

12. In a machine of the class described, the combination of box-supporting means, a plunger adapted to enter the box to insert a lining sheet therein, said plunger being laterally expansible towards both the end and side walls of the box to press the lining sheet thereto, means carried by said plunger and vertically movable therewith for folding a marginal portion of the lining sheet over the top edge of the end wall, and relatively stationary folder actuating means operatively associated with said folding means when the plunger is in lowered position.

13. In a machine of the class described, the combination of box-supporting means, a plunger adapted to enter the box to insert a lining sheet therein, said plunger comprising a carrier, a bottom member vertically adjustably mounted on said carrier and provided with means for holding the lining sheet to the plunger, a pair of side parts connected to said bottom part for unitary vertical movement therewith but so that said side parts are laterally adjustable towards the adjacent corners of the box, parallel link means connecting each of said side parts with the carrier, and resilient means normally maintaining said bottom member and side parts in downwardly adjusted relation to the carrier, whereby said side parts are laterally outwardly adjustable as an incident to downward movement of the carrier relative to said bottom member.

14. In a machine of the class described, the combination of box-supporting means, means for applying a lining sheet to the end wall and adjacent portions of the side walls of the box on said supporting means, said lining sheet applying means comprising a plunger having a width less than the interior width of the box, means for applying a lining sheet to the face of said plunger and folding marginal portions of such sheet over the opposite sides of the plunger, and means for moving said plunger into the box adjacent an end wall to be lined, said plunger being expansible after its insertion in the box so as to press the lining sheet and its folded marginal portions to the end wall and the adjacent side wall portions, substantially as described.

15. In a machine of the class described, the combination of box supporting means, and a plunger adapted to enter the box to insert a lining sheet therein, said plunger comprising a carrier and bottom and side portions independently adjustably connected to said carrier, the bottom portion being adapted to clamp the lining sheet against the box bottom, and said side portions being laterally expansible relative to said bottom portion as an incident to engagement of said side portions with the box bottom.

16. In a machine of the class described, the combination of means for supporting a box, a plunger, means for effecting attachment of a lining sheet to said plunger, means for bending marginal portions of the sheet to form flanges extending laterally from the normal plane of the sheet, means for effecting movement of said plunger into a box disposed on said supporting means and into such position as to apply said sheet to an inside wall portion of the box, with the flanges of the sheet overlapping adjacent wall portions, means for effecting release of the sheet from the plunger, and means for effecting withdrawal of the plunger from the box so as to leave said sheet applied to said wall portions.

JACOB SCHNUR.